(12) United States Patent
Navarra Pruna

(10) Patent No.: US 7,111,550 B2
(45) Date of Patent: Sep. 26, 2006

(54) SEQUENTIAL NUMBERING OF PIECES OBTAINED BY INJECTION

(75) Inventor: Alberto Navarra Pruna, Barcelona (ES)

(73) Assignee: Comercial de Utiles y Moldes, S.A., (ES)

( * ) Notice: Subject to any disclaimer, the term of this patent is extended or adjusted under 35 U.S.C. 154(b) by 67 days.

(21) Appl. No.: 10/979,363

(22) Filed: Nov. 2, 2004

(65) Prior Publication Data

US 2006/0081137 A1     Apr. 20, 2006

(30) Foreign Application Priority Data

Oct. 18, 2004   (EP) .................................. 04380206

(51) Int. Cl.
*B41L 45/00* (2006.01)
(52) U.S. Cl. ......................................... 101/76; 101/110
(58) Field of Classification Search ............ 101/72–77, 101/110; 425/190, 150; 249/102–104
See application file for complete search history.

(56) References Cited

FOREIGN PATENT DOCUMENTS

EP          1 410 893 A1     4/2004

*Primary Examiner*—Anthony H. Nguyen
(74) *Attorney, Agent, or Firm*—Schiff Hardin LLP

(57) ABSTRACT

A numbering apparatus incorporates a push rod which is pushed mechanically by an ejector plate or other mechanism of an injection mold in each injection process. The push rod moves, in a linear direction, a link attached to a central cylinder which turns inside wheels having, on their outer face, marking digits. The wheels have an inner toothing, on which pressure is exerted by a comb, made up of comb teeth, that protrude externally from the central cylinder in order to change the position of the wheel in the forward direction of the central cylinder. The digit displayed, while also incorporating magnets, matching up with the outer face of the wheel which assist in securing the position of the comb, thereby preventing the wheel from turning while the cylinder is sliding back.

7 Claims, 7 Drawing Sheets

SEQUENTIAL NUMBERING OF PIECES OBTAINED BY INJECTION

BACKGROUND

The present invention relates to a sequential numbering apparatus used for marking plastics pieces obtained by an injection process.

The applicant of the present invention is also the holder of European patent no. EP 1 410 893 wherein a sequential numbering system is described as used for marking pieces produced by injection. This numbering system has a synchronizing mechanism which defines a new numeration for each process of injection of a new piece, a numeration which will be marked on every piece produced.

The mechanism basically comprises cams associated with parallel wheels which each have the digits corresponding to the numbers 0 to 9 defined on their periphery. Every turn of the cam determines the turn of its wheel and, therefore, the change of the number displayed, which will be marked on every new piece produced by injection.

Every one of the cams has a series of 9 projections on its periphery combined with matching recesses and a cavity. This assembly lies inside a housing on which a shaft protrudes that moves sequentially in a linear direction pushed mechanically by the action of the mold ejection plate in the injection process for each piece. This shaft is linked to a lever with arms coupled at its ends. The first of these is provided with a toothed sector which, under the action of the shaft and after the rocking of the lever, pushes one of the projections, turning the cam together with its respective wheel, determining the sequential advance of the number.

The other arm has contact dowels that keep the cams locked, except the one that is being pushed by the first arm.

Once the cam has pushed the nine projections, the toothed sector reaches the cavity in the cam, so that this cam is locked. Then, in the following cycle, when the lever turns, it turns the second cam, which has another wheel associated and, therefore, another set of digits, and in this way the rotation of the following cams takes place successively, thereby changing the numeration associated with each piece.

Despite producing a satisfactory performance, this solution can be simplified by reducing the number of parts involved in the operating cycle of the mechanism, this being precisely the object of the invention described below.

SUMMARY

It is the object of the invention that the sequential numbering system has a small number of parts taking up little space in order to achieve low manufacturing costs, while at the same time assuring proper function.

The sequential numbering apparatus for pieces produced by injection presented in this invention simplifies the construction via a mechanism with a small number of parts that synchronizes the movement of the injection mechanism in each injection process with the numbering to be marked on the piece.

The sequential numbering has a built-in pressure spindle/push rod which is pushed either by the ejection plate or by another part of the mold, and associated with the movement of this, the push rod has a link attached eccentrically to a central cylinder, causing it to turn. The central cylinder has a comb provided with a series of teeth arranged in a transverse housing standing slightly extended from the periphery of the central cylinder, forming a mechanism for pushing wheels, which have a toothed inner face, alternating recesses with projections, while the digits to be marked are on the outer face of the wheels.

Various embodiments of the invention are described as follows. In an embodiment, the numbering has a toothed wheel for every group of symbols, for instance, digits from 0 to 9, while the wheels are separated from one another by fixed intermediate crowns that have the same form as the wheels and which assist the sealing of the assembly, permitting the filtration of an external material from entering between the moving parts.

The comb is in a transverse receptacle in the cylinder and it is subjected to the pressing action of a spring in a longitudinal direction, in such a way that it is in permanent contact with the toothed sector of one of the wheels. The comb is made up of various teeth of different lengths in a stepped arrangement, so that the longest comb tooth is in contact with the wheel corresponding to the unit digits, and the other teeth of progressively decreasing length form the mechanism of pushing, e.g., the tens wheels, the hundreds wheels, and so on.

The ascending stroke of the push rod determines the movement of the link and the, e.g., anticlockwise rotation of the cylinder, then the comb, situated on the central cylinder, pushes the toothed sector of the wheel, which it turns, changing the digit of the outer face of the wheel. When the push rod descends, the central cylinder turns clockwise and the wheel is fixed by the action of magnets, then the comb is positioned in the next recess in the wheel. The same process is repeated again the next time the push rod rises.

In the position of one of the recesses, the wheels of the units are designed to have a large cavity in which the longest tooth is inserted under spring pressure, with the result that the tooth situated next on the comb also moves outwards engaging with the toothing of its respective wheel so that both wheels turn together.

If the wheels have numbers etched on the outer surface, the first wheel would correspond to the units, the second to the tens, and so on with the rest of the wheels. The cavity would then be defined in digit 9 on the first wheel, so that, as the two wheels turn together, with the next stroke of the push rod, the wheel would move to the first number of the tens, then the longest tooth disengages from the large cavity and enters another one of the recesses, determining the withdrawal of the tooth from the tens wheel, which will then cease to contact with the toothed sector of this wheel, thereafter bringing about the rotation of the unit wheel only, so as to proceed with a new cycle until reaching the aforesaid cavity to repeat the same operation again.

The operation of the shift from the second to the third wheel or for this case of the tens to the hundreds and subsequent ones is similar to that described for the shift from the first to the second wheel, i.e., from the units to the tens, as all the wheels have a large cavity for the sequential rotation of the wheels, continuing in this way with the consecutive numbering.

In addition, the sequential numbering may optionally have a screen in which data are displayed relating to the production of the injected pieces in conjunction with software provided.

The case may arise when it is of interest that a series of pieces should come out with the same numbering, with the marker kept in the same position. In this case, in an embodiment, when the numbering has been assigned to a series of pieces, the marker moves one position, maintaining the same numbering for the next series of pieces.

To succeed in alternating consecutive numbering with the constant series numbering, a provision is made for the optional fitting of a spacer, which may be a ball, for instance, that communicates the push rod with the link, through the intermediation of a plunger with which it contacts the spacer and in relation to which the link pivots. The location of this spacer determines the transmission of the movement of the push rod to the link, while the absence of the spacer means that the movement of the push rod is not transmitted to the link and the same numbering is therefore kept constant for all the pieces of the same series. The plunger is guided with a certain clearance in its movement in a window defined for the purpose.

When there is a need for the user to establish one of the two modes described, he should act in order to reflect this situation in the software. It is considered that the placement or otherwise of the spacer in the position described, between the push rod and the plunger, should be entrusted to a rotation mechanism, such as a servo-controlled gear motor, which would be accommodated in a housing in which the push rod would also be located parallel to the motor.

The motor output shaft is fitted with a ball joint that accommodates the spacer, which, as described previously, may be a ball, in a housing provided for the purpose. The ball joint, actuated by the motor, makes the necessary turn to position the spacer between the push rod and the plunger when the intention is to establish the consecutive numbering mode, or else it withdraws the spacer from this position to set up the constant numbering mode.

Control of the pieces is carried out via software associated with the motor and production of the injected pieces could be displayed on a monitor.

Furthermore, in an embodiment, the numbering has a magnetic field sensor that picks up the force of a magnet, situated on the push rod, during its movement, and an electric signal is produced that is used for counting the injected pieces, irrespective of whether they are numbered consecutively or not, thereby enabling the system to be controlled electronically. This control is important, as it is useful to know the number of pieces actually injected irrespective of the indication marked by the numbering, since, as has been seen, there may possibly be no correlation between both quantities. The sensor sends the information to an electronic card/circuit which reads the number of pieces injected.

Once the last piece of a series has been counted, the spacer is ordered to take up its position again between the push rod and the plunger so that the numbering will advance one number. The spacer is then disengaged and the same number corresponding to the next series of pieces is marked.

DESCRIPTION OF THE DRAWINGS

To supplement the description that is being given and in order to assist a clearer understanding of the features of the invention, in accordance with a preferred example of a practical embodiment of same, the present description is accompanied by a set of drawings illustrating various embodiments of the invention, but not limiting the scope of the invention.

DETAILED DESCRIPTION OF THE PREFERRED EMBODIMENTS

According to an embodiment of the invention, an apparatus for the sequential numbering of pieces produced by injection starts from the basic incorporation of a push rod 1 which is pressed mechanically by an ejector plate or other mechanical mechanism of the injection mold in each process of injection of a piece. The apparatus is also made up of a series of digits 2, legends or figures, located at the perimeter of a series of parallel wheels 3 for marking the piece produced.

Figure 1:
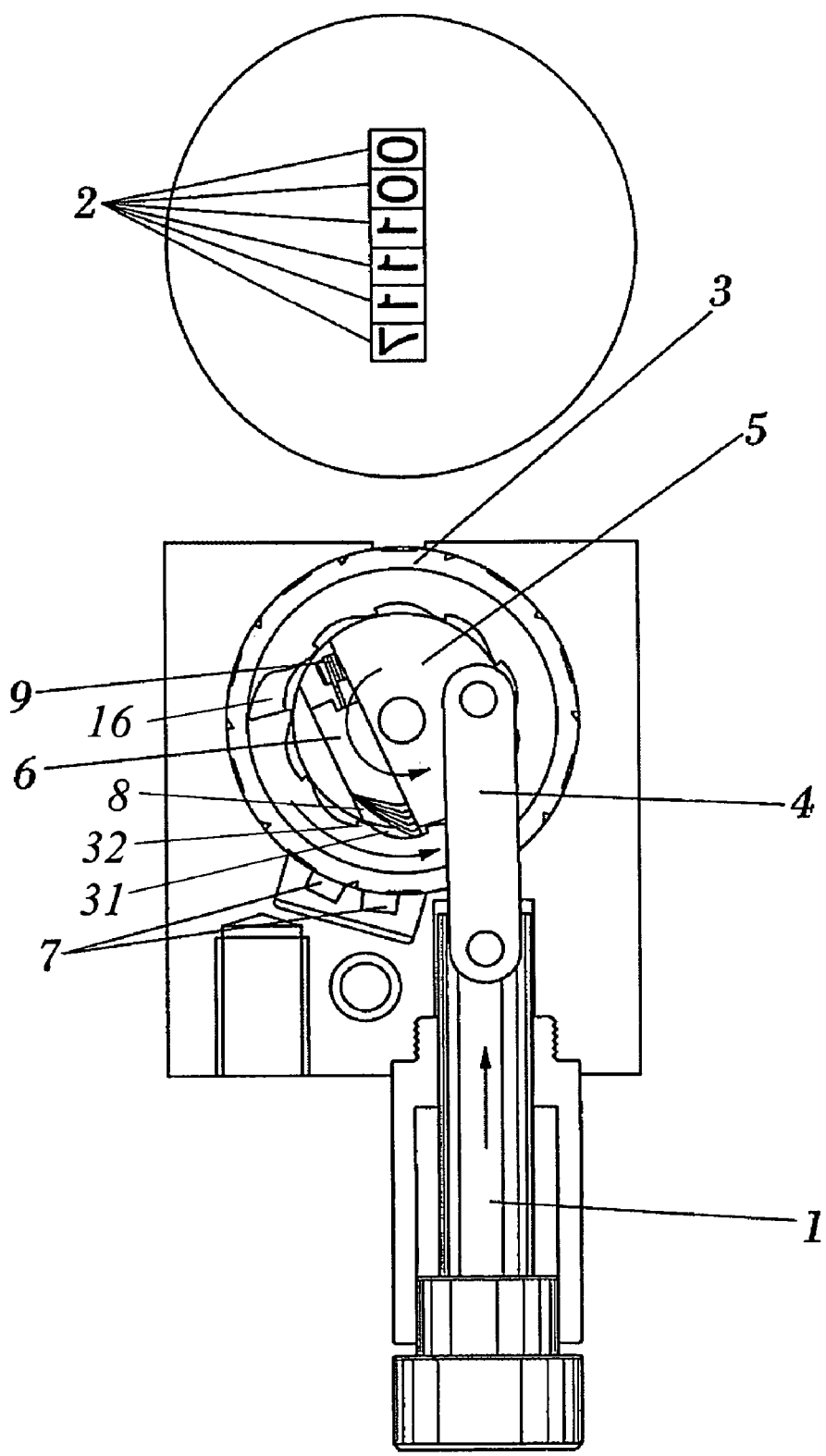
FIG. 1 is a pictorial schematic drawing showing an initial embodiment of the sequential numbering for a position of the push rod with the cylinder turning counter-clockwise and the longest tooth of the comb pushing the unit wheel, while the numbering is displayed at its side.
Figure 2:
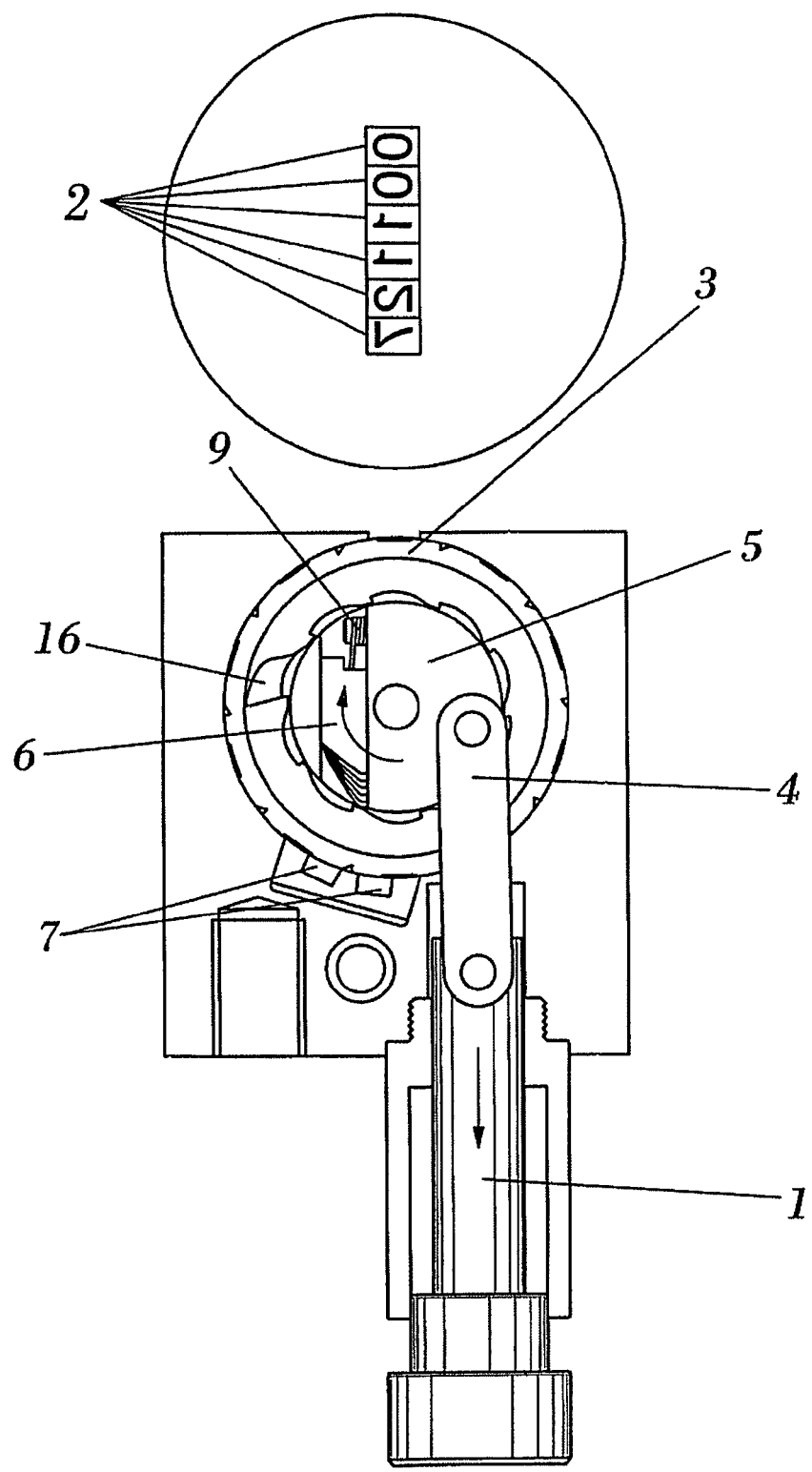
FIG. 2. is a pictorial schematic drawing showing the first embodiment of the sequential numbering in a situation subsequent to that represented in the previous figure in which the cylinder turns clockwise and the longest tooth moves back to engage in the next recess in the unit wheel.

Starting from these items, the embodiment incorporates a link 4 that moves in a linear direction under the action of the push rod 1 and is attached to a central cylinder 5 which it turns inside the wheels 3 provided with an inner toothing defined by recesses 31 and projections 32, projections 32 on which pressure is exerted by a comb 6, formed of teeth 61–63 (FIG. 5), which passes through and protrudes externally from the central cylinder 5 in order to change the position of the wheel 3 in the direction of forward movement of the central cylinder 5 and therefore of the digit displayed, as may be observed in FIG. 1. The embodiment may incorporate magnets 7 matching up with the outer face of the wheel 3 which assist in the securing the position of the comb 6, thus preventing the rotation of the wheel 3 while the cylinder slides back under the action of the descending stroke of the push rod 1, as may be seen in FIG. 2.

Figure 5:
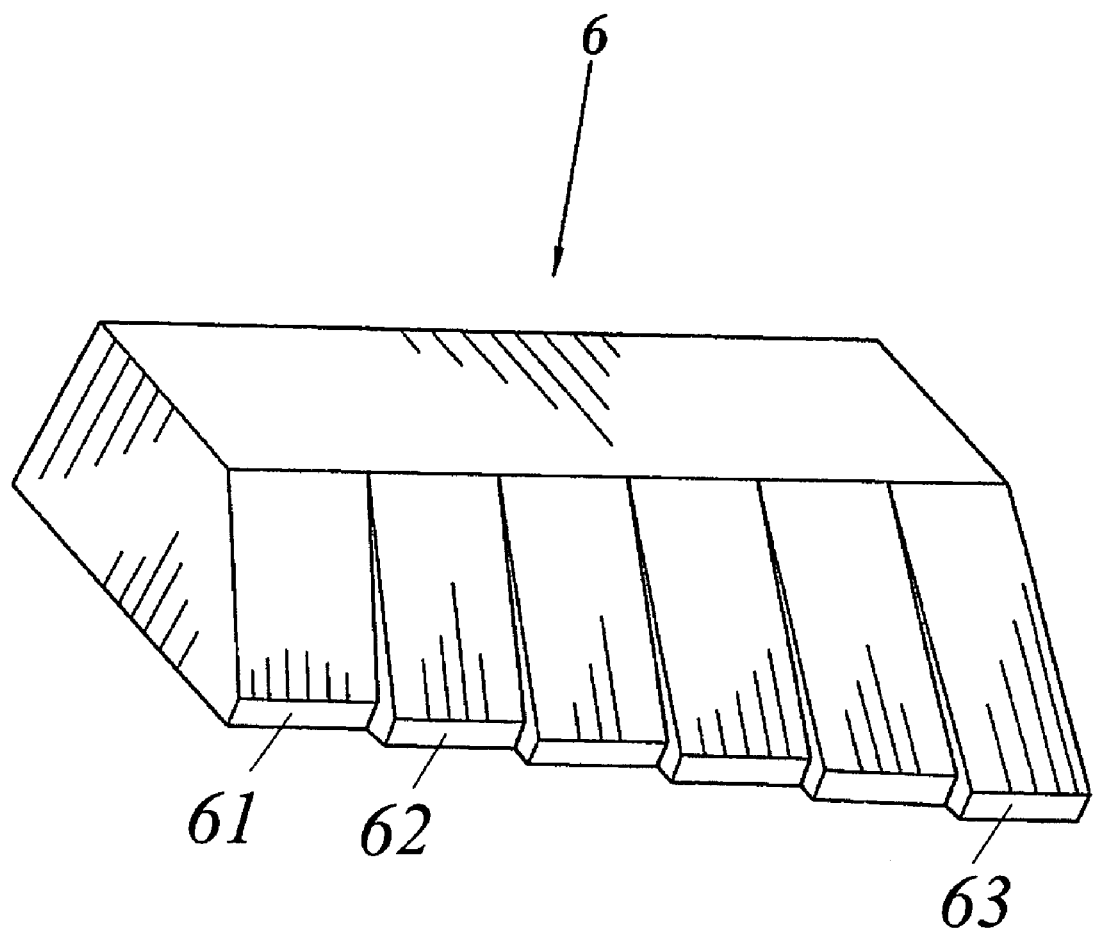
FIG. 5. is a perspective view of the comb formed by the comb teeth.

FIG. 5 the comb 6 that is made up of a set of teeth 61–63, one per wheel 3, situated in a stepped arrangement of progressively decreasing length from the largest tooth 63 corresponding to the first wheel, or the unit wheel, and it is housed in a transverse receptacle 8 defined in the central cylinder 5, inside which it slides outwards under the action of a pressure spring 9.

Figure 3:
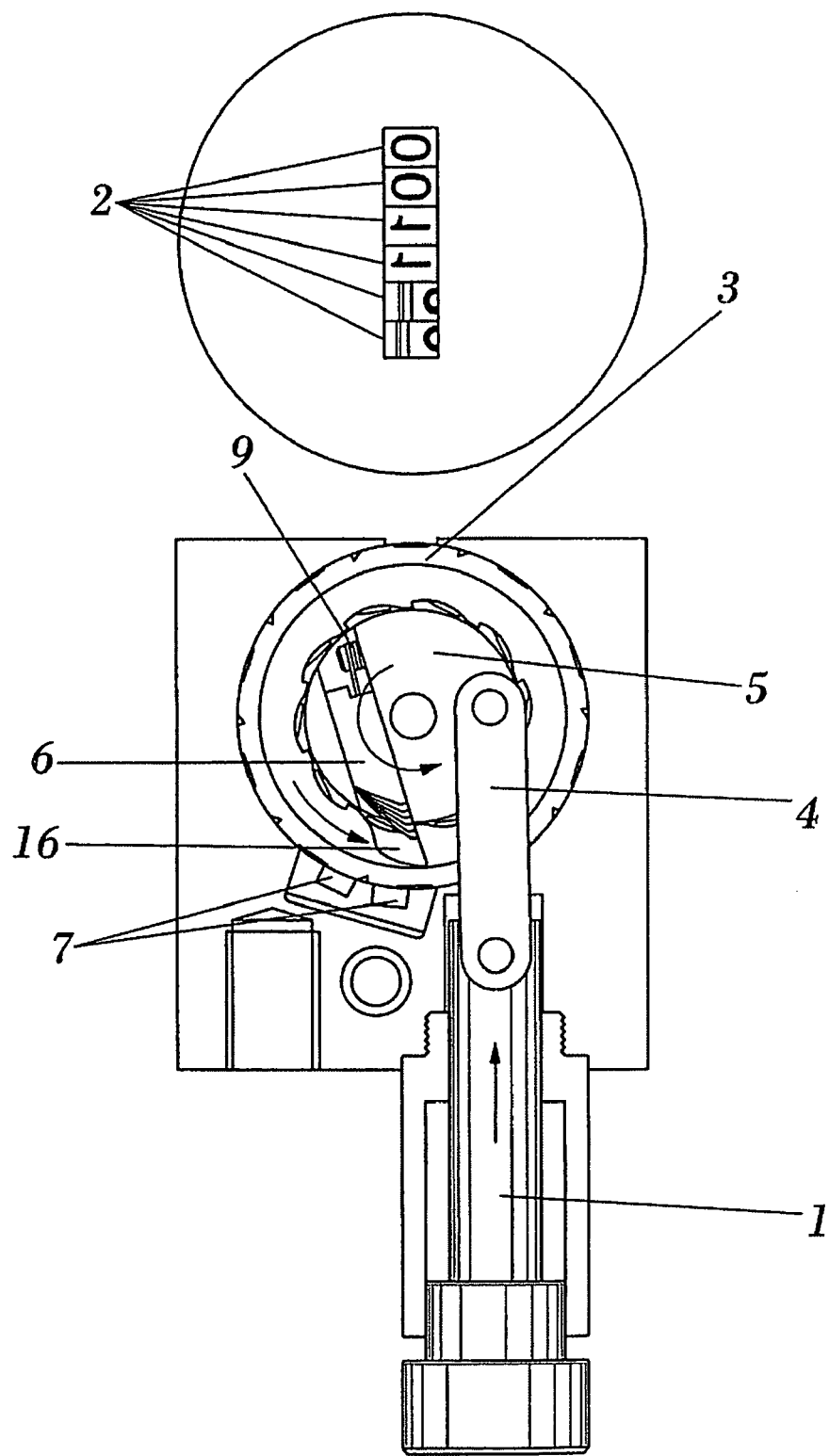
FIG. 3. is a pictorial schematic drawing showing the first embodiment in which the longest tooth penetrates the larger cavity, turning counter-clockwise and pushing the unit wheel, while the adjoining shorter tooth, which will push the tens wheel (not shown) at the same time, is also engaged.
Figure 4:
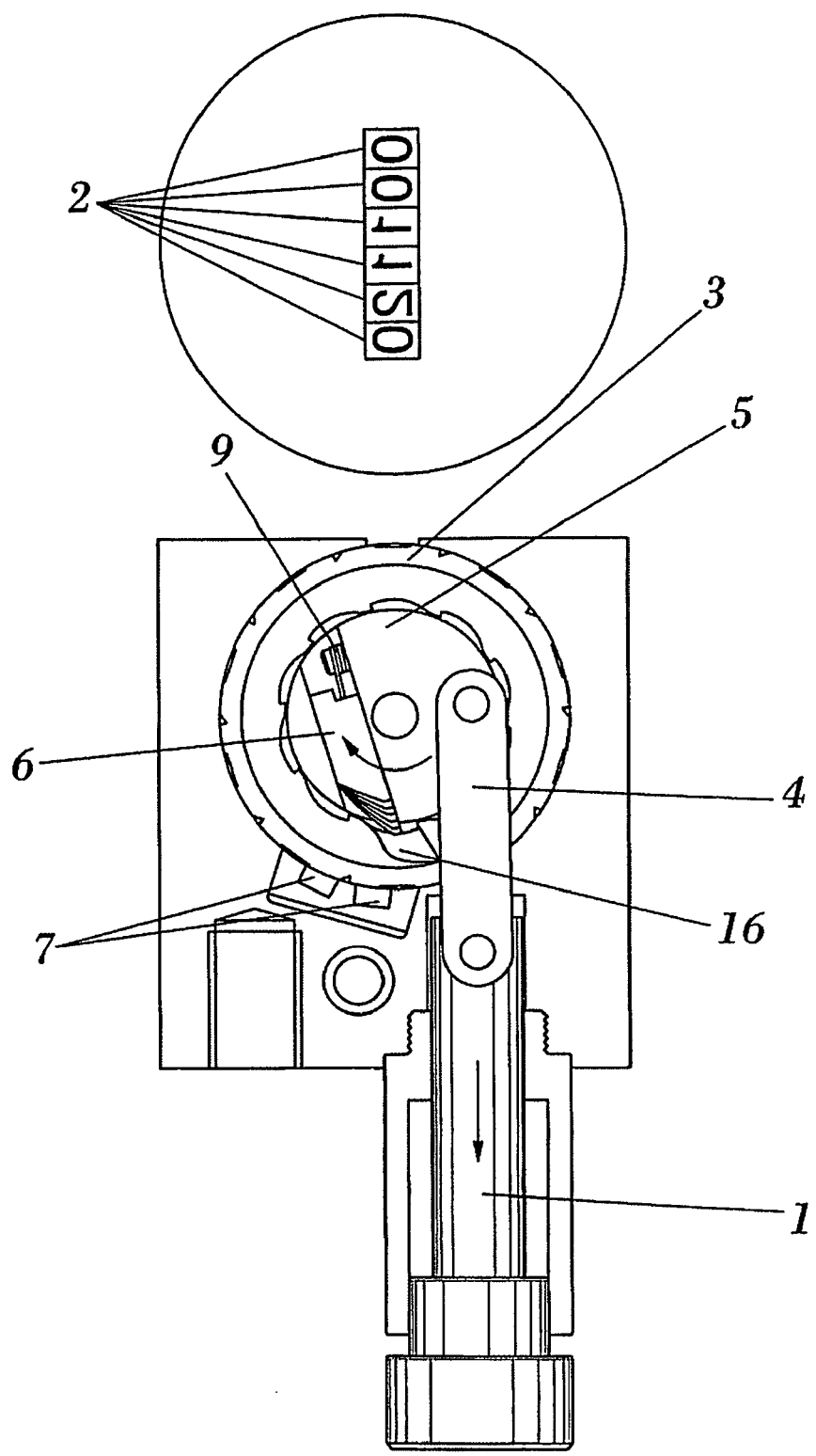
FIG. 4. is a pictorial schematic drawing showing the stage following that shown in the previous figure in which the longest tooth turns clockwise, issuing from the larger cavity and determining the disengagement of the tooth from the adjoining tens wheel.

As illustrated in FIGS. 3 & 4, each of the wheels 3 should have a large cavity 16 matching up with one of the recesses which determines the engagement of a longer tooth 62 under the action of the spring 9 and therefore the resultant movement of the next tooth of shorter length 61 in contact with the toothing of the next wheel 3 for simultaneous pushing of the two wheels 3 until the longer tooth 62 issues from the large cavity 16 in the following stroke of the push rod 1.

Figure 8:
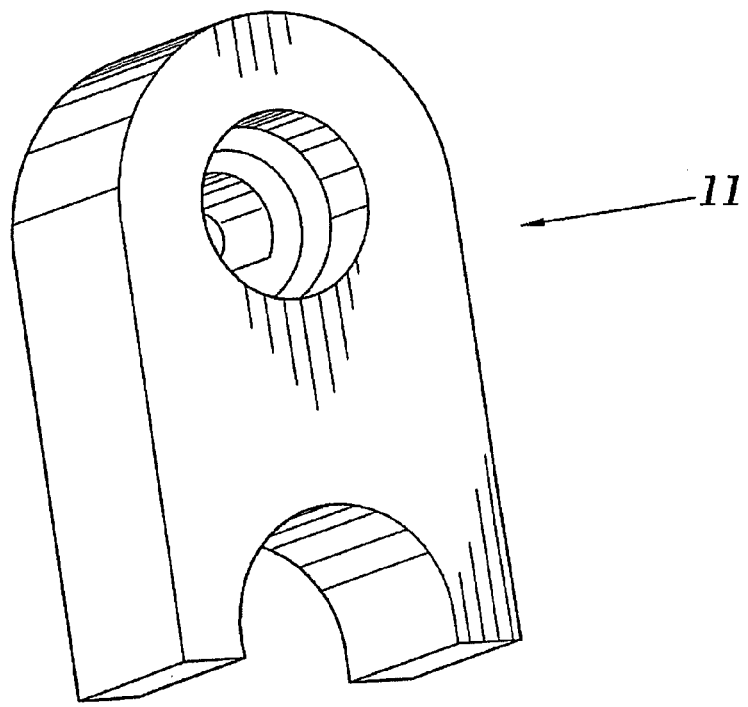
FIG. 8. is a perspective view of the ball joint.

An embodiment the sequential numbering apparatus incorporates a spacer 10, which may be, e.g., a ball located between the push rod 1 and a plunger 20 on which the link 4 pivots, forming a mechanism for transmitting the movement of the push rod 1 to the link 4 in the consecutive marking of pieces, a spacer 10 that is fitted on a ball joint 11 FIG. 8, which rotates transversely under the action of a motor 12 determining the movement of the spacer 10 and the detachment of the push rod 1 from the plunger 20 to prevent the rotation of the wheels 3 in the ensuing forward strokes of the push rod 1, thereby establishing the same marking for a series of pieces.

Figure 7:
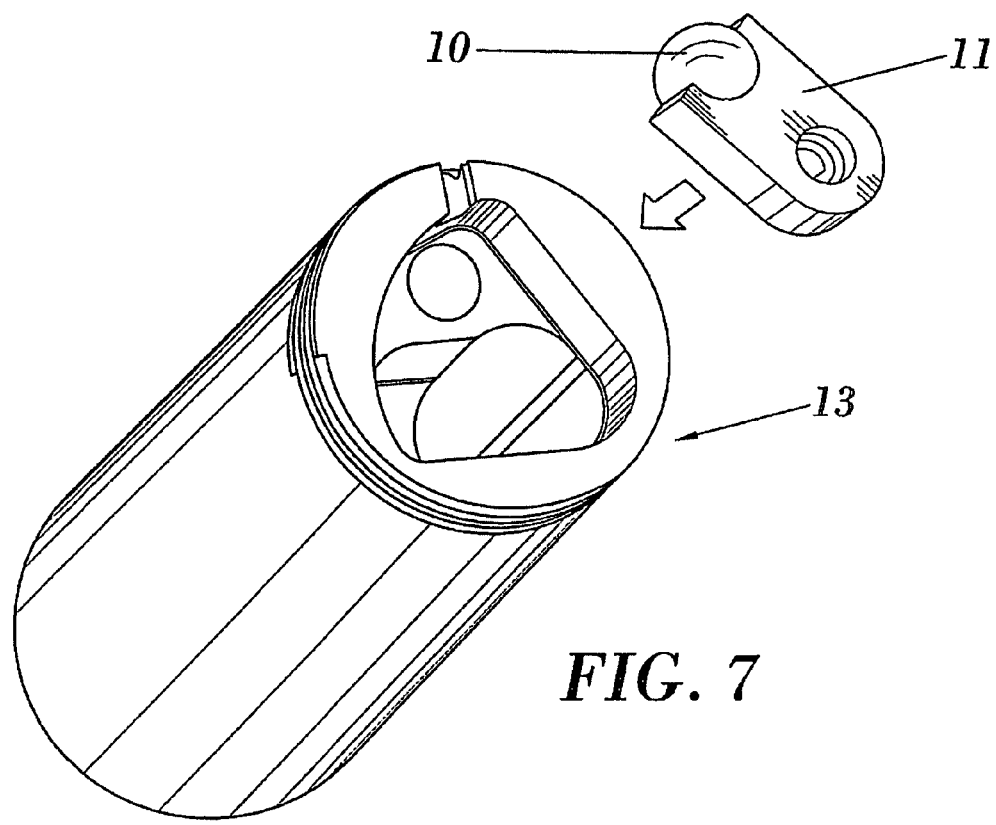
FIG. 7. is a perspective view of the housing that contains the motor and the push rod in which the ball joint and the spacer fitted in this housing may also be seen.

The plunger 20 is guided in its movement by a guide 19. In this situation, the push rod 1 and the motor 12 are fitted inside the same housing 13 represented in FIG. 7.

Figure 6:
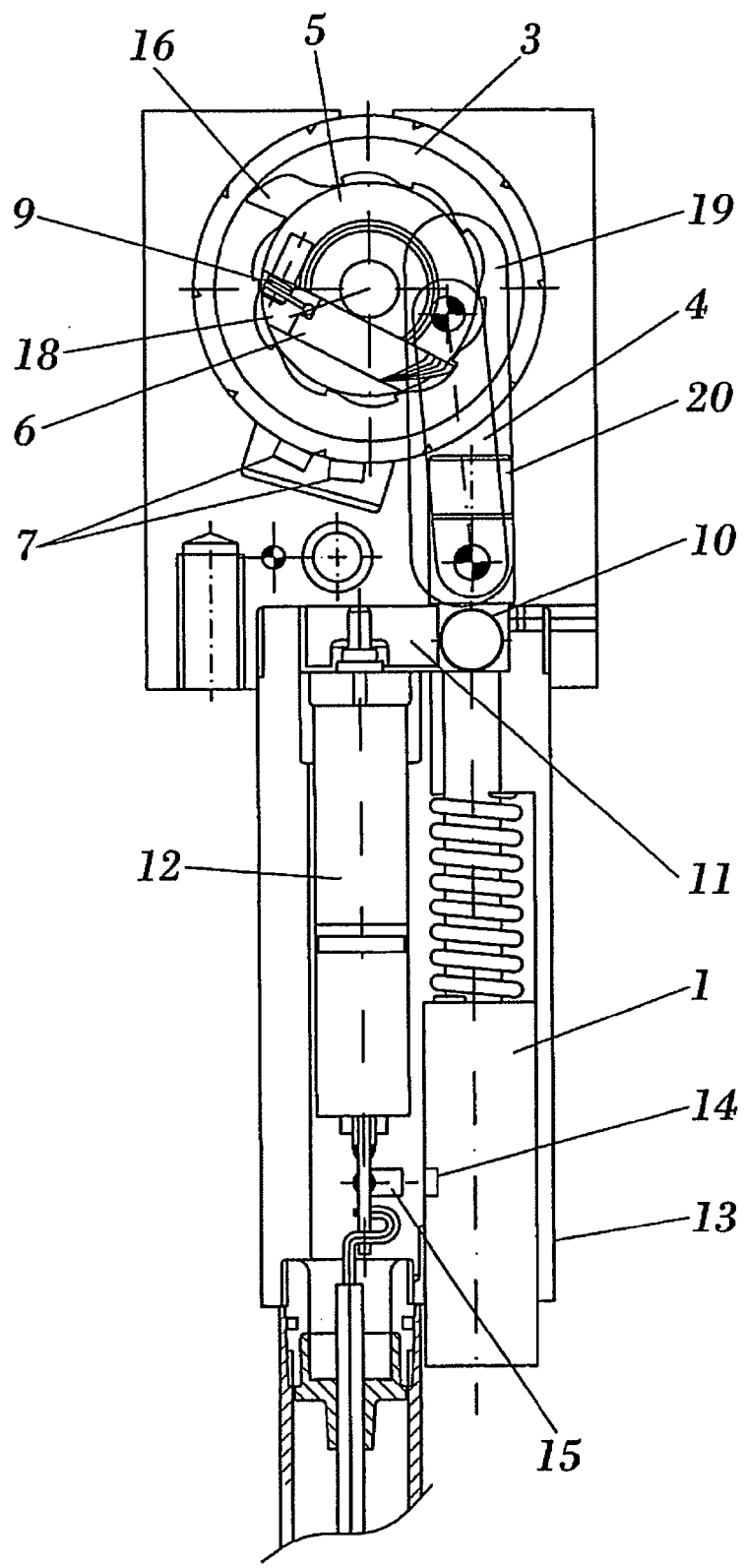
FIG. 6. is a pictorial schematic drawing showing of another embodiment of the sequential numbering apparatus which incorporates a motor associated with a ball-shaped spacer by way of a ball joint that permits the operating mode to be changed from consecutive marking to constant marking of the same number.

The sequential numbering is provided with a counter magnet 14 on the push rod 1, as may be observed in FIG. 6, matching up with a fixed magnetic field sensor 15 which detects the movement of the push rod 1 and sends information to an electronic card/circuit of the number of pieces injected corresponding to each upward stroke of the push rod 1, irrespective of the indication marked by the numbering.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional structural and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. An apparatus configured for sequentially numbering pieces produced by injection, comprising:
 a push rod configured to be pushed mechanically by an ejection plate or other mechanical mechanism of an injection mold in each process of injection of a piece;
 a series of parallel wheels;
 a series of digits, legends, figures or symbols, situated on a perimeter of the series of parallel wheels that correspond to units, tens and other powers of ten or other base unit systems for numerically marking a produced piece;
 a link configured to slide in a linear direction under action of the push rod;
 a central cylinder that is attached to the link and is configured to turn inside the wheels provided with inner toothing defined by recesses and projections;
 a comb configured to exert pressure on the projections formed of the teeth, the comb passing through and protruding externally from an opening in the central cylinder in order to change a position of at least one of the wheels in a direction of forward movement of the central cylinder and therefore of a digit displayed; and
 magnets matching up with the outer face of the wheel configured to assist in securing a position of the comb, thereby preventing a rotation of the at least one of the wheels while the central cylinder slides back.

2. The apparatus according to claim 1, wherein:
 the comb comprises a set of comb teeth situated in a stepped arrangement of progressively decreasing length from a largest tooth corresponding to a first wheel or a unit wheel; and
 the central cylinder comprises:
 a pressure spring; and
 a transverse receptacle in which the comb is housed and inside which the comb slides outwards under action of the pressure spring.

3. The apparatus according to claim 1, further comprising:
 a spring;
 wherein each one of the wheels comprises:
 a large cavity matching up with one of the recesses engaging a longer comb tooth under an action of the spring,
 a next comb tooth of shorter length that is moved as a result of the engaging that is in contact with the toothing of a next wheel that simultaneously pushes two wheels until the longer comb tooth issues from said large cavity in a following stroke of the push rod.

4. The apparatus according to claim 1, further comprising:
 a plunger;
 a spacer located between the push rod and the plunger, with which the link pivots, forming a mechanism for transmitting movement of the push rod to the link in a consecutive marking of pieces; and
 a ball joint upon which the spacer is fitted, which rotates transversely under an action of a motor determining movement of the spacer and a detachment of the push rod from the plunger to prevent the rotation of the wheels in ensuing forward strokes of the push rod, establishing the same marking for a series of pieces.

5. The apparatus according to claim 4, further comprising: a guide configured to guide the plunger its movement.

6. The apparatus according to claim 4, further comprising: a housing in which both the push rod and the motor are fitted.

7. The apparatus according to claim 1, further comprising:
 a counter magnet on the push rod; and
 a fixed magnetic field sensor that matches up with the counter magnet and is configured to detect movement of the push rod and send information to an electronic circuit related to a number of pieces injected corresponding to each upward stroke of the push rod, irrespective of an indication marked by the numbering.

* * * * *